United States Patent
Minekawa et al.

(10) Patent No.: US 9,342,879 B2
(45) Date of Patent: May 17, 2016

(54) METHOD AND APPARATUS FOR REVIEWING DEFECT

(75) Inventors: Yohei Minekawa, Tokyo (JP); Kenji Nakahira, Tokyo (JP); Minoru Harada, Tokyo (JP); Takehiro Hirai, Tokyo (JP); Ryo Nakagaki, Tokyo (JP)

(73) Assignee: Hitachi Hich-Technologies Corporation, Tokyo (JP)

( * ) Notice: Subject to any disclaimer, the term of this patent is extended or adjusted under 35 U.S.C. 154(b) by 0 days.

(21) Appl. No.: 14/347,127

(22) PCT Filed: Jul. 6, 2012

(86) PCT No.: PCT/JP2012/067266
§ 371 (c)(1),
(2), (4) Date: Mar. 25, 2014

(87) PCT Pub. No.: WO2013/046848
PCT Pub. Date: Apr. 4, 2013

(65) Prior Publication Data
US 2014/0219546 A1 Aug. 7, 2014

(30) Foreign Application Priority Data
Sep. 26, 2011 (JP) .................. 2011-208404

(51) Int. Cl.
*G06K 9/00* (2006.01)
*G06T 7/00* (2006.01)

(52) U.S. Cl.
CPC .............. *G06T 7/0004* (2013.01); *G06T 7/001* (2013.01); *G06T 2207/10061* (2013.01); *G06T 2207/20016* (2013.01); *G06T 2207/30148* (2013.01)

(58) Field of Classification Search
CPC .................. G06T 7/0004; G06T 7/001; G06T 2207/20016
USPC ................................... 382/145, 149
See application file for complete search history.

(56) References Cited

U.S. PATENT DOCUMENTS 6,691,052 B1 * 2/2004 Maurer ........................ 702/81
7,873,202 B2 1/2011 Kurihara et al.
(Continued)

FOREIGN PATENT DOCUMENTS

JP 2007-40910 A 2/2007
JP 3893825 B2 3/2007
(Continued)

OTHER PUBLICATIONS

International Search Report with English translation dated Oct. 2, 2012 (3 pages).

Primary Examiner — Samir Ahmed
(74) Attorney, Agent, or Firm — Crowell & Moring LLP

(57) ABSTRACT

A method for reviewing defect, comprising the steps of: as an image acquisition step, imaging a surface of a sample using arbitrary image acquisition condition selected from a plurality of image acquisition conditions and obtaining a defect image; as a defect position calculation step, proceeding the defect image obtained by the image acquisition step and calculating a defect position on the surface of the sample; as a defect detection accuracy calculation step, obtaining a defect detection accuracy of the defect position calculated by the defect position calculation step; and as a conclusion determination step, determinating whether the defect detection accuracy obtained by the defect detection accuracy calculation step meets a predetermined requirement or not; wherein until it is determined that the defect detection accuracy obtained by the defect detection accuracy calculation step meets a predetermined in the conclusion determination step, the image acquisition condition is selected from the plurality of image acquisition conditions once again and the image acquisition step, the defect position calculation step, the defect detection accuracy calculation step and the conclusion determination step are repeated.

17 Claims, 9 Drawing Sheets

(56) References Cited

U.S. PATENT DOCUMENTS

| | | | |
|---|---|---|---|
| 2001/0042705 A1* | 11/2001 | Nakagaki et al. | 209/44.4 |
| 2005/0205780 A1* | 9/2005 | Nakagaki et al. | 250/311 |
| 2006/0282190 A1* | 12/2006 | Hirai et al. | 700/110 |
| 2007/0067134 A1* | 3/2007 | Borowicz et al. | 702/127 |
| 2007/0194231 A1* | 8/2007 | Nakahira et al. | 250/310 |
| 2011/0261190 A1 | 10/2011 | Nakagaki et al. | |

FOREIGN PATENT DOCUMENTS

| | | |
|---|---|---|
| JP | 2010-87322 A | 4/2010 |
| JP | 2011-189358 A | 9/2011 |
| WO | WO 2010/038883 A1 | 4/2010 |

\* cited by examiner

FIG.4
(a) in case of continuously execution
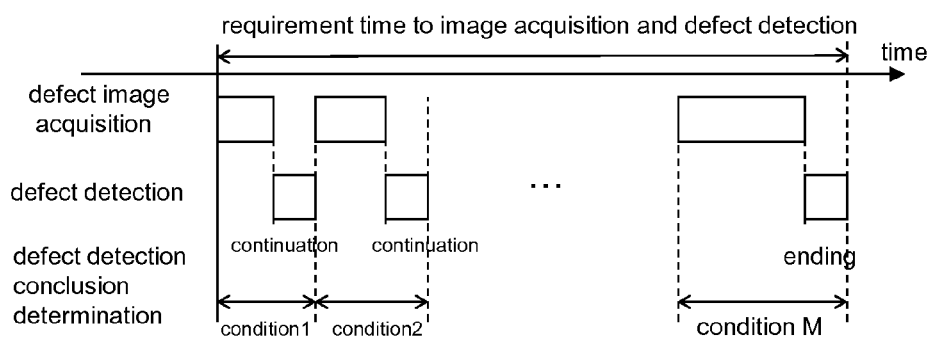
(b) in case of parallel execution
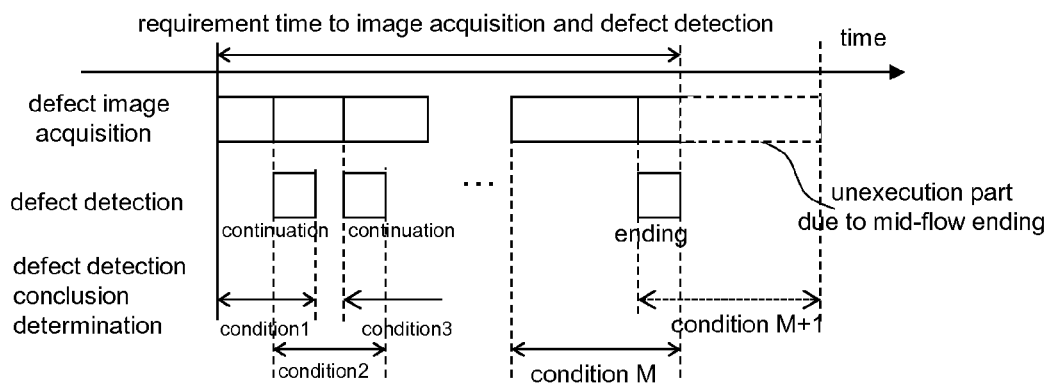

FIG.6

| | | largeness of defect | | |
|---|---|---|---|---|
| | | big | middle | small |
| | (1) image size small (pixel size large) | defect detection accuracy: high | defect detection accuracy: low | defect detection accuracy: low |
| | (2) image size middle (pixel size middle) | defect detection accuracy: high | defect detection accuracy: high | defect detection accuracy: low |
| | (3) image size large (pixel size small) | defect detection accuracy: high | defect detection accuracy: high | defect detection accuracy: high |

602  601 image acquisition conditions

FIG.7

| | | defect coordinates accuracies | | |
|---|---|---|---|---|
| | | high | middle | low |
| (1) image size small (imaging field of view small) | | defect detection accuracy: high | defect detection accuracy: low | defect detection accuracy: low |
| (2) image size middle (imaging field of view middle) | | defect detection accuracy: high | defect detection accuracy: high | defect detection accuracy: low |
| (3) image size large (imaging field of view large) | | defect detection accuracy: high | defect detection accuracy: high | defect detection accuracy: high |

602  601 image acquisition conditions

FIG.9

■ADR result

901 — number of defect : 150
sum of proceeding time : 12000

Image acquisition recipe

804

| image acquisition conditions | | | | | ADR results | | | |
|---|---|---|---|---|---|---|---|---|
| order | using flag | frame addition amount | image size | imaging field of ... | number of execution | number of conclusion | ending rate | time |
| 1 | ✔ | 1 | 500 | 9.0 | 150 | 0 | 0 | 20 |
| 2 | ✔ | 2 | 500 | 9.0 | 150 | 30 | 20 | 40 |
| ⋮ | | | | | | | | |
| — | ☐ | 3 | 250 | 9.0 | — | — | — | — |
| — | ☐ | 2 | 250 | 7.0 | — | — | — | — |

902

Time expectation: 10000

(optimization) (▽down) (△up) (deletion)

(OK)

903    807    808    809
810

METHOD AND APPARATUS FOR REVIEWING DEFECT

BACKGROUND OF THE INVENTION

The present invention relates to a defect review method and a defect review apparatus which is used to review a semiconductor wafer.

For improvement of yield in semiconductor manufacturing process, it is important that the source of defect on a semiconductor wafer be immediately investigated. At semiconductor manufacturing sites, defects are currently analyzed with a defect inspection apparatus and a defect review apparatus.

The defect inspection apparatus observes wafers with optical means or electron beam and outputs detected defect positional coordinates.

It is important that the defect inspection apparatus rapidly process a board area. Therefore, the defect inspection apparatus reduces the amount of image date by maximizing (that is, by lowering the resolution)the image area of be acquired per one pixel (hereinafter "pixel size").

In most cases, a detected low-resolution image may indicate the presence of any defect, but it is difficult to discriminate a type of the defect (defect type) in exact detail.

Under such circumstances, the defect review apparatus is used to discriminate the defect type detected by the defect inspection apparatus in exact detail.

The defect review apparatus images a defect at a defect coordinate of a wafer by high-resolution using an output information generated by the defect inspection apparatus and outputs an image.

As the defect size is now on the order of tens of nanometers due to an increased degree of miniaturization, the semiconductor manufacturing process requires a resolution on the order of several nanometers in order to review the details of defects.

As such being the case, the defect review apparatus (hereinafter "review SEM") using a scanning electron microscope has been widely used in recent years.

An automatic review operation is desired in a semiconductor high-volume production line The review SEM mounts an ADR (Automatic Defect Review) function, which automatically acquires an image at defect coordinates of a sample.

ADR is a function which automatically acquires a high-resolution image at defect area using the defect coordinates obtained by the defect inspection apparatus.

There is an issue that a margin of error between defect coordinates outputted by the defect inspection apparatus and actual defect coordinates.

In general, there is about ±4 [μm] variation as a margin of error of the defect coordinates outputted by the defect inspection apparatus.

So if the area at a defect coordinates outputted by the defect inspection apparatus is imaged by high-resolution, a field of view is about 2.5 [μm] (for example, magnification is 50000), it has a potential that there is no defect in the field of view.

Therefore, an image is taken by a first magnification (for example magnification is 15000), which field of view is about 9 [μm], then a defect is detected based on the low-resolution image, and an area at detected defect is taken by a second magnification (for example magnification is 50000).

The specific realization method of ADR is described in JP-P-3893825. In JP-P-3893825, first, a defect image imaged at a defect area by a low magnification (a first magnification) and a perfect image imaged at the area patterned a same pattern as the defect area are respectively obtained.

Then these two images are compared and the differenceis decided as a defect and a defect coordinate is detected.

Regarding the detected defect coordinate, a high-resolution defect image is imaged by a high-resolution (a second magnification).

The semiconductor wafer is arranged a plurality of identical chips.

So it is possible to use the image of the chip next to the defect existing chip as a perfect image.

In recent years, the number of defects to be reviewed per wafer has increased due to an increase in the diameters of semiconductor wafers. In addition, the review apparatus exhibits a lower throughput than the inspection apparatus. Consequently, the speed of ADR needs to be increased.

Regarding a general flow of ADR disclosed in JP-P-3893825, a considerable amount of time is spent on moving a stage between an initial position and target position and imaging a perfect image and a defect image.

Therefore, regarding a speeding up of ADR, increasing the speed of these operations and eliminating some imaging procedures are efficiently.

In JP-A-2007-40910, the technology is described that a perfect image is made from a defect image and comparison the perfect image and the defect image as a technology about imaging a perfect image which technology is often eliminated generally.

The technology described in JP-A-2007-40910 is such that a perfect image is made from a defect image using a repeat pitch of circuit pattern of the defect image and a defect is detected by comparison detection between the defect image and the made perfect image.

In a general ADR processing described in JP-P-3893825, a considerable amount of time is spent on moving a stage between an initial position and a target position and imaging a perfect image and a defect image. Therefore, the shortening of the image obtaining time including imaging an image can't be achieved.

The technology described in JP-A-2007-40910 is such that the method to detect defects without using a perfect image, but shortening the time required for defect images obtaining is not sufficiently studied.

Image obtaining time relies on the combination of the image obtaining conditions such as amount of frames of adding and averaging obtained images (hereinafter "frame addition amount") and amount of imaging pixels (hereinafter "image size").

In general, imaging image of SEM has low S/N, the same area is imaged F frames (F≥1) and an adding and averaging image of F images is outputted as a obtaining image.

If frame addition amount increases, S/N of obtained image also increases, but the image obtaining time also increases.

Also, if image size increases, much amount of information could be obtained, but the image obtaining time also increases.

As well, image size, imaging field of view and area per pixel (pixel size) have a relation each other. For example, if an image size increases, the pixel size decreases, so it become possible to detect smaller defect.

If the imaging field of view increases, it is possible to detect defect even though a defect position coordinates accuracy (hereinafter "defect coordinates accuracy") of a defect inspection apparatus is low.

It may not obtain the enough pixel size to defect detection without increasing the pixel size.

In case of defect detection operation about low-magnification image obtained by low-magnification in ADR, an accuracy of defect coordinates by defect detection (hereinafter "defect detection accuracy") is important.

Image obtaining condition basically should be set as a condition which obtains a enough defect detection accuracy (frame addition amount is large and image size is large) regardless of the kind and largeness of the defect and low-magnification defect image is obtained.

In general, images (for example high S/N and so on) obtained by the image obtaining condition which needs more time to obtain images are apt to obtain high defect detection accuracy.

But some images which obtained by the image obtaining condition which is shorter time to obtain an image may have high defect detection accuracy (that is the case is easy to detect a defect) depending on a kind of defect (for example a big defect) or defect coordinates accuracy.

In particular, in case of large defects, it is possible to obtain a high defect detection accuracy even though the images are imaged by some low S/N imaging obtaining condition or a imaging obtaining condition of large pixel size (that is image size is small).

Additionally, in case of high defect coordinates accuracy, an image detected by the image obtaining condition of small imaging field of view (that is the image size is small) is possible to obtain high defect detection accuracy.

The technology described in JP-A-2007-40910 is such that skip of imaging a perfect image increases the ADR throughput.

But in this method, obtaining a defect image, using the fixed image obtaining condition for the case that defect detection is not easy, is condition regardless of in case of that the defect detection is easy as discussed previously.

The way to shorten a defect image obtaining time isn't studied.

SUMMARY OF THE INVENTION

The present invention relates to a defect review method and a defect review apparatus that make it possible to shorten a defect image obtaining time.

Brief summary of typical invention in the inventions disclosed in this specification is as below.

A method for reviewing defect, comprising the steps of: as an image acquisition step, picking-up a surface of a sample using arbitrary image acquisition condition selected from a plurality of image acquisition conditions and obtaining a defect image; as a defect position calculation step, proceeding the defect image obtained by the image acquisition step and calculating a defect position on the surface of the sample; as a defect detection accuracy calculation step, obtaining a defect detection accuracy of the defect position calculated by the defect position calculation step; and as a conclusion determination step, determinating whether the defect detection accuracy obtained by the defect detection accuracy calculation step meets a predetermined requirement or not; wherein until it is determined that the defect detection accuracy obtained by the defect detection accuracy calculation step meets a predetermined in the conclusion determination step, the image acquisition condition is selected from the plurality of image acquisition conditions once again and the image acquisition step, the defect position calculation step, the defect detection accuracy calculation step and the conclusion determination step are repeated.

The present invention enables a defect review method and a defect review apparatus that make it possible to shorten the defect image obtaining time.

BRIEF DESCRIPTION OF THE DRAWINGS

FIG. 4 is a timing chart illustrating an embodiment of defect image obtaining and defect detection.

FIG. 6 is obtaining image examples and defect detection accuracy of these images illustrating the second embodiment of in case that the image obtaining is done about defects which largeness are different using image obtaining conditions which image size and image pixel are different.

FIG. 7 is obtaining image examples and defect detection accuracy of these images illustrating the third embodiment of in case that the image obtaining is done about defects coordinates accuracies are different using the image obtaining conditions which each image size and imaging field of view are different.

FIG. 9 is a GUI example illustrating an embodiment of displaying ADR results based on registered image obtaining conditions and modifying the image obtaining conditions.

DETAILED DESCRIPTION OF THE PREFERRED EMBODIMENTS

Hereinafter, embodiments of the present invention will be concretely described with referent to the drawings.

As well, in principal, the same symbol is set to the same composition, repetitive explanation is skipped.

Hereinafter, a semiconductor review SEM using scanning electron microscope that is a one embodiment of the present invention will now be described.

Figure 1:
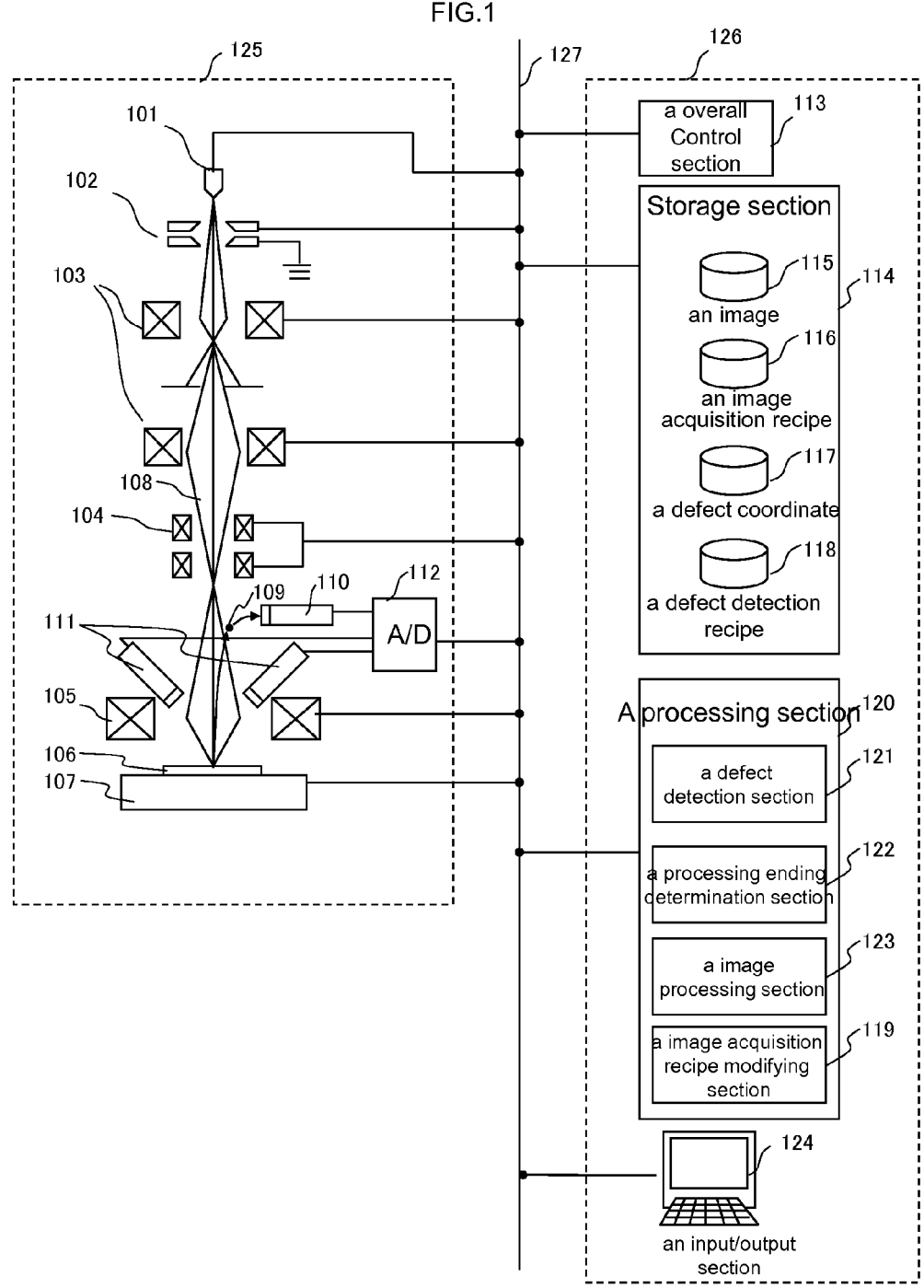
FIG. 1 is a diagram illustrating an embodiment of a defect review apparatus.

FIG. 1 is a diagram illustrating an embodiment of a defect review apparatus (review SEM apparatus).

The review SEM apparatus (The review SEM apparatus according to the first embodiment of the present invention) of the first embodiment of the present invention includes an SEM image imaging section 125 and a processing section 126.

A bus 127 is connected between the SEM image imaging section 125 and the processing section 126.

A sample 106 is set on a stage 107 to be described.

The SEM image imaging section 125 includes an electron source 101 for generating primary electrons 108, an acceleration electrode 102 for accelerating the primary electrons, a focusing lens 103 for converging the primary electrons 108, a deflector 104 for scanning and deflecting the primary electrons two-dimensionally, an objective lens 105 for converging the primary electrons 108 on the sample 106, a stage 107 for movable in an X-Y plane set for the sample 106, a detector 110 for detecting the secondary electrons 109 generated from the sample 106, a detector 111 for detecting the primary electrons reflected from the surface of the sample 106 and digitalization section 112 for digitalizing (A/D transforming) the detected signals.

These parts of SEM image imaging section 125 are connected to an overall control section 113 via the bus 127.

A signal processing section 126 includes a processing section 120, a storage section 114, an input/output section 124, which includes, for instance, a keyboard, mouse, and other similar device for giving instructions to the apparatus and a monitor, printer, and other device for outputting data from the apparatus and the overall control section 113.

These are connected each other via the bus 127.

The storage section 114 includes an image storage section 115 for storing detected image data, a image acquisition recipe storage section 116 for storing a combination of parameters (hereinafter "image acquisition condition") including information (hereinafter "image acquisition recipe"), the parameters are frame addition amount, image size and electrical optical condition in case of imaging images, a defect coordinates storage section 117 for storing a defect coordinate detected by the other defect inspection apparatus including the optical inspection apparatus, and a defect detection recipe storage section118 for storing image processing parameters in case of defect detection.

The information included in the image acquisition recipe stored in the image acquisition recipe storage section 116 and details of image acquisition condition are to be described.

A processing section 120 includes a defect detection section 121 for detecting defects from the images detected to be included the defect, processing ending determination section 122 for ending determining of image acquisition and defect detection process based on the detection results of the defect detection section 121, an image processing section 123 for operating the image processing including adding and averaging process and S/N improvement process to the images detected by the SEM image imaging section 125, and an image acquisition recipe modifying section 119 for modifying the image acquisition recipe information (an image acquisition condition, the order of using the image acquisition conditions) stored in the image acquisition recipe storage section 116.

A detail processing substance of the processing ending determination section 122 and the image processing section 123 are to be described.

Then, FIG. 1 will be used to described an automatic defect review method of a review SEM of the present invention.

(setting a semiconductor wafer 106)

First, before imaging, the semiconductor wafer 106 is set on the stage 107.

(recipe selection)

An operator selects the recipe for the ADR from a plurality of image acquisition recipes and a defect detection recipes registered in the image acquisition recipe storage section 116 and the defect detection recipe storage section 118 via the input/output section 124.

The input/output section 124 indicates the overall control section 113 to process the ADR by the condition based on the inputted information.

Also, the defect detection recipe stores the image processing parameters of the defect detection (defect detection sensitivity, visible layer information) and the like.

Also, the image acquisition recipe stores a plurality of combination of parameters (image acquisition conditions) which the parameters are the wide variety of electrical optical condition of image acquisition (for example an accelerating voltage, a probe current, imaging field of view), frame addition amount of acquisition images, the image size and the pixel size and the like.

The image acquisition recipe also stores the order of the image acquisition as the image acquisition condition together.

The stored image acquisition condition is not limited to the value of the parameters, may be the range of the value of the parameters.

In case of setting the range of value of the parameters, it is possible to generate a plurality of the image acquisition conditions changing the value of the parameters within the range.

It is same thing with a plurality of image acquisition conditions exist in the image acquisition recipe.

In what follows, if the only one image acquisition condition is stored in the image acquisition recipe, it is described under the assumption that there is a plurality of image acquisition conditions in the image acquisition recipe, when the range of the parameters as the like are stored together in the image acquisition recipe and a plurality of image acquisition conditions could be generated.

(reading of the defect coordinates information)

The overall control section 113 is indicated to process the ADR by the condition stored by the input/output section 124 and reads the defect coordinates information of automatic review target from the defect coordinates storage section 117.

(acquisition of review images)

The processing of explained below S201~S203 (FIG. 2) is processed to each defect using the read defect coordinates, and images (hereinafter "review images") to review the defects on the samples of detail are acquired.

Here, the defect coordinates of automatic review target are the defect coordinates detected by the other inspection apparatuses.

The other inspection apparatuses are (i) the apparatus acquires the signals using the optical method and detects the defects, (ii) the apparatus acquires the signals using the irradiating means of irradiating a charged particle beam to the sample and detects the defects.

It need to imaging under come frames to imaging observable images in detail of the defect of the sample.

(acquisition of review images (1) the stage movement)

First, the stage 107 is moved to include the defect coordinates in the acquisition range of an electron optical system.

(acquisition of review images (2) acquisition at the first magnification)

Next, the imaging is processed, in general, there is about ±4 [μm] error between the defect coordinates read from the defect coordinates storage section 117, which detected by the other defect inspection apparatus in advance, and the actual defect coordinates.

Therefore, an image is taken by a first magnification (for example magnification is 15000), a field of view of about 9 [μm], in such a way as to the defect is included in the field of view.

(acquisition of review images (3) acquisition at the second magnification)

However, in case of imaging at the first magnification, it is impossible to review the defect in detail.

So the defect coordinates are detected from the imaged images and the area at detected defect coordinate is imaged at the second magnification (for example the magnification is 50000).

Figure 2:
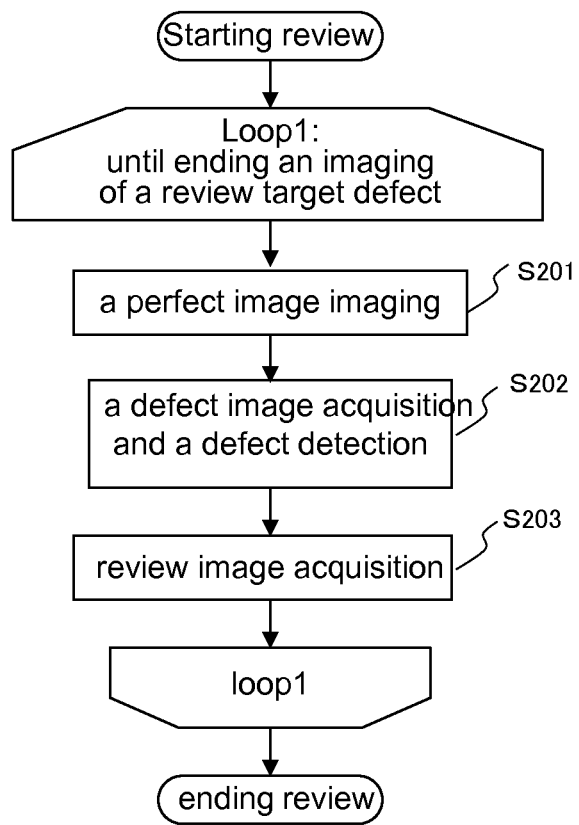
FIG. 2 is an operating flowchart illustrating an embodiment of defect review.

FIG. 2 is an operating flowchart illustrating an embodiment of defect review of this invention.

The method of automatically acquiring of the review images of the review SEM to the present invention will be described (acquisition of review images (2)-(3)).

Review images at all defect coordinates of review targets indicated by a user are automatically obtained to repeat the proceeding of S201~S203.

All defect coordinates of review targets are indicated from the defect coordinates detected by the other defect inspection apparatus.

(acquisition of review images (2) detail of the acquisition at the first magnification)

The embodiment performs step S201 to image the area which patterned the same pattern as to a defect part at the first magnification and obtain a perfect image.

The semiconductor wafer is arranged a plurality of identical chips.

It is possible to use the image of the chip next to the defect existing chip as a perfect image.

However, step S201 of this embodiment is not essential processing, step S201 could be skipped. The way of skipping the step S201 is ,for example, a generated image in advance is used as a perfect image or a perfect image is made by merging a plurality of defect images.

The embodiment performs step S202 to acquire an image including a defect (hereinafter "a defect image") at the first magnification and detect a defect from the acquired defect images using the defect detection section 121.

Detail of step S202 will be described with reference to FIG. 3.

(acquisition of review images (3) detail of the acquisition at the second magnification)

The embodiment performs step S203 to image an image at a defect area detected by step S202 at the second magnification and acquire a review image.

(detail description of step S202)

Hereinafter, detail of step S202 will be described.

As discussed previously, image obtaining time of step S202 relies on the image obtaining conditions such as the frame addition amount of the obtained images and the image size.

In general, imaging images of SEM has low S/N, the same area is imaged F frames (F≥1) and an adding and averaging image of F images is obtained.

Then the accuracy of defect coordinates by defect detection (defect detection accuracy) is improved by processing the defect detection processing against to the adding and averaging image.

In the case that the defect detection accuracy is low, it is a high possibility to fail to the defect detection. The failure is detecting a coordinate of noise and the like besides the defect.

If frame addition amount increases, S/N of obtained image also increases, but the image obtaining time also increases.

Also, if image size increases, much amount of information could be obtained, but the image obtaining time increases.

As well, image size, imaging field of view and pixel size have a relation each other. For example, if an image size increases, the pixel size decreases, so it become possible to detect smaller defect.

If the imaging field of view increases, the defect detection accuracy becomes high, because it is possible to include the defect in the imaging field of view, even though the defect position coordinates accuracy (defect coordinates accuracy) of a inspection apparatus is low.

It may not obtain the enough pixel size to obtain the enough defect detection accuracy without increasing the pixel size.

In general, images (for example high S/N and so on) obtained by the image obtaining condition which needs more time to obtain images are apt to obtain high defect detection accuracy.

But some images which obtained by the image obtaining condition which is shorter time to obtain an image may have high defect detection accuracy (that is the case is easy to detect a defect) depending on a kind of defect (for example a big defect) or defect coordinates accuracy.

In particular in case of large defects, it is possible to obtain a high defect detection accuracy even though the images are imaged by some low S/N imaging obtaining condition or a imaging obtaining condition of large pixel size (that is image size is small).

Additionally, in case of high defect coordinates accuracy, an image detected by the image obtaining condition of small imaging field of view (that is the image size is small) is possible to obtain high defect detection accuracy.

Then, in the present invention, the image acquisition recipe defined more than one image acquisition condition in advance is registered on the image acquisition recipe storage section 116. The embodiment performs step S202 to process the image acquisition and defect detection processing by the image acquisition condition stored in the image acquisition recipe.

The image acquisition and defect detection processing are processed in order of the image acquisition time of the acquisition condition from shortest to longest.

If the defect detection accuracy of the obtained defect detection result is high, the processing is concluded at that point.

By this method, in the case of that defect detection is easy (for example the large defects and the like are target), the image acquisition process and defect detection process against to the condition of the image obtainable are concluded at short times.

So this method enables to increase a processing speed of step S202.

A registration method of an image acquisition recipe will be described.

As well, a condition used to the defect detection is the condition stored in the defect detection recipe storage section 118.

Figure 3:
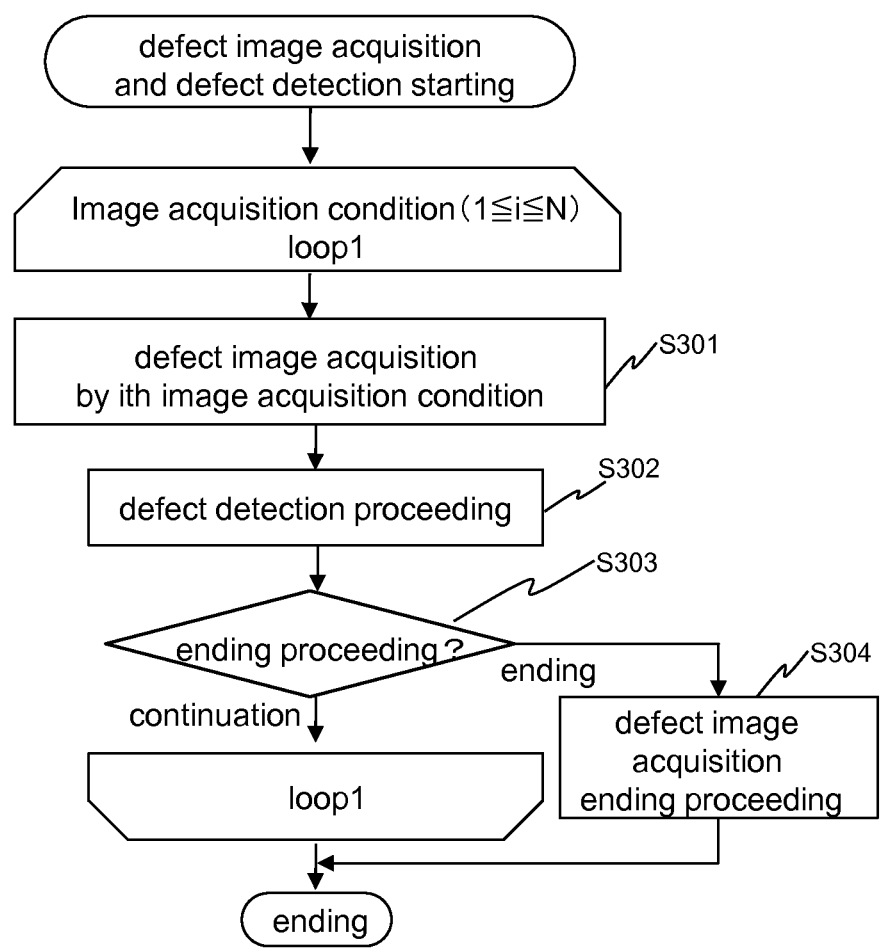
FIG. 3 is an operating flowchart illustrating an embodiment of defect image obtaining and defect detection.

FIG. 3 is an operating flowchart illustrating an embodiment of defect image obtaining and defect detection (S202 of FIG. 2).

The image is acquired using the image acquisition condition in the image acquisition recipe stored in the image acquisition recipe storage section 116 and the defect detection processing is done to the acquired image.

As well, the image acquisition condition may be a portion of condition and may be all stored conditions of the image acquisition conditions of the image acquisition recipes.

Hereinafter, a method of processing a defect image acquisition and a defect detection using N (N≥2) image acquisition conditions will be now described.

The embodiment performs step S301 to acquire the defect images using ith (1≤i≤N) image acquisition condition.

The embodiment performs step S302 to perform the defect detection processing by the defect detection section 121 to the defect images acquired in step S301.

A method of defect detection may be a method of comparing inspection that comparing a defect images and a perfect image and detecting the difference position between the two images as a defect position.

In particular, an image is calculated to calculate the brightness value difference between a defect image and a perfect image per pixel, the image is transformed to binary using a predetermined threshold and the like, and center position of the pixels which value is more than the threshold is detected as a defect position.

In the case that S/N of a defect image is low, a method of detection a difference between a detection image and a perfect image as a defect may cause false detection.

The false detection is that detecting broad area of the entirely screen because of noise and detecting a noise as a defect area.

To detect an appropriate defect area, the embodiment may perform step S302 to set the binary threshold being relatively high and lower the detection sensitivity trying not to detect a noise as a defect.

Also, after the defect image acquisition processing S301 is performed at ith image acquisition condition, the next defect image acquisition processing S301 of condition i+1 may be processed in series.

In that case, step S302 and step S303 to the defect image acquired by the ith image acquisition condition and step S302 and step S303 to the defect image acquired by the (i+1)st image acquisition condition are processed in parallel.

The timing of parallel processing will be described with reference to FIG. 4(b).

In step S303, the processing ending determination section 122 determines concluding the defect image acquisition and defect detection proceeding or continuing these proceedings based on the defect detection result in step S302 (Hereinafter S303 is called "a processing conclusion determination").

In particular, the defect detection accuracy is calculated in regard to the defect detection result in step S302.

In this case, if the defect detection accuracy is high (for example more than a threshold), a proceeding is determined to conclude, step S304 process is performed and dropping out of the loop 1.

Otherwise, if the defect detection result's accuracy of the defect detection result is low (for example less than a threshold), a proceeding is determined to proceed, next image acquisition and defect detection proceeding of (i+1)st image acquisition condition.

Information of a threshold as the like of the defect detection accuracy may be inputted from the input/output section 124 by a user or be read from files as the like.

The defect detection accuracy is quantified value of defect detection result's accuracy in step S302, The defect detection accuracy is calculated based on the Crude density of binary result near the coordinate detected by the difference between a perfect image and a defect image in step S302.

The cause of lowering the defect detection result accuracy is false detection of noise.

Noise often arises entirely screen in a random manner.

In the case that the binary result of the detected coordinate doesn't close up, it more likely to detect noise, low defect detection accuracy may be outputted.

Otherwise, in the case that the binary result of the detected coordinate closes up, it more likely to detect a defect area accurately, high defect detection accuracy may be outputted.

Otherwise, in the case that the binary result doesn't detect any area (that is there is no defect coordinate), it may be determined that there is no defect within the image, low defect detection accuracy may be outputted and proceedings of step S301~step S303 are proceeded.

The embodiment performs step S304 to conclude the defect image acquisition and drop out of loop 1.

Also, in the case that step S302 and step S303 in regard to the defect image acquired by the ith image acquisition condition and image acquisition step S302 by the next condition (i+1)st are performed in parallel, the proceed of step S301 may be concluded at that position.

In general, in case of the parallel proceeding of step S302, step S303 and step S301, the proceeding time of S301 is longer than the proceeding time of S302 and S303.

The proceeding of step S301 often doesn't conclude at the timing of conclusion determination in step S303.

FIG. 4 is a timing chart illustrating an embodiment of defect image obtaining and defect detection.

The timing chart to do as below proceeding with reference to FIG. 4.

FIG. 4(a) shows the case that the image acquisition S301 and the defect detection proceeding S302 are performed in a continuous manner (not to perform in parallel).

FIG. 4(b) shows the case that the image detection proceeding S302 of ith and the defect acquisition S302 of (i+1)st are performed in parallel (to perform in parallel).

Both FIG. 4(a) and FIG. 4(b) are the example to determine as proceeding conclusion in the processing conclusion determination S303 of the image acquisition condition M (1M<N).

In the case of parallel performance of FIG. 4(b), if the condition determined as conclusion is condition M, it is thought that the defect image acquisition of condition (M+1) is performed in parallel at the time of conclusion of the defect detection proceeding of condition M.

So, the image acquisition proceeding of condition (M+1) is concluded by the defect image acquisition conclusion proceeding S304 at the time of conclusion of the defect detection proceeding of condition M and determination of conclusion in proceeding conclusion determination.

Now therefore, requirement time of image acquisition and defect detection is the time that elapses before the proceeding conclusion determination of condition M.

In case that midstream conclusion is not allowed, requirement time of image acquisition and defect detection is the time that elapses before the defect image acquisition conclusion of condition (M+1).

Parallel proceeding of the defect image acquisition and the defect detection enables to reduce the proceeding time of the defect detection compared to the proceeding of FIG. 4(a).

Parallel proceeding of the defect image acquisition and the defect detection enables to increase the speed of the defect image acquisition and the defect detection (FIG. 3).

Then, the parameter included the image acquisition recipe stored in the image acquisition recipe storage section 116 will be described.

The parameters are frame addition amount or image size (relates to imaging field of view and pixel size) and the like.

In this present invention, the defect image acquisition and the defect detection S202 are performed as respects to each combination of the parameters (image acquisition condition).

A plurality of image acquisition conditions changed each parameters (fixed value besides the parameters described about) are registered in the image acquisition recipe storage section 116.

In what follows, in case that the proceeding of S301~S303 are performed in regard to the all registered conditions.

First Embodiment (Frame Addition Amount)

Hereinafter, in case that the image acquisition conditions, which frame addition amounts are different, is registered in the image acquisition recipe will be described.

In general, if the frame addition amount increases, S/N of obtained image also increases, but the image obtaining time also increases.

In particular, in case of large defects, it is possible to obtain a high defect detection accuracy even though the images are imaged by some low S/N imaging obtaining condition.

It is possible to conclude the image acquisition and the defect detection at short times.

A method of proceeding of S301 will be described in case that the image acquisition conditions' frame addition amounts are different.

Hereinafter, it will be described in case that the conditions (N) stored frame addition amount of consecutive and different values is registered in the image acquisition recipe storage section 116.

In this case, only the frame addition amounts are different so it is inefficient to image again the defect images from lth frame in every condition.

Then, the condition is used in order of the frame addition amount from smallest to largest (the order is 1~N of the frame addition amount) (that is index of the image acquisition condition i=frame addition amount).

The images which picked up per each frame are stored in the image storage section 115.

When the image of (i)th frame designated by the (i)th condition (1<i≤N) is imaged, the images to the point of (i−1)th (images from $1^{st}$-(i−1)st frames) are read from the image storage section 115 and added and averaged and adding and averaging image of frame addition amount i is obtained.

This method enables to omit the overlap of image imaging and reduce the defect imaging time.

Figure 5:
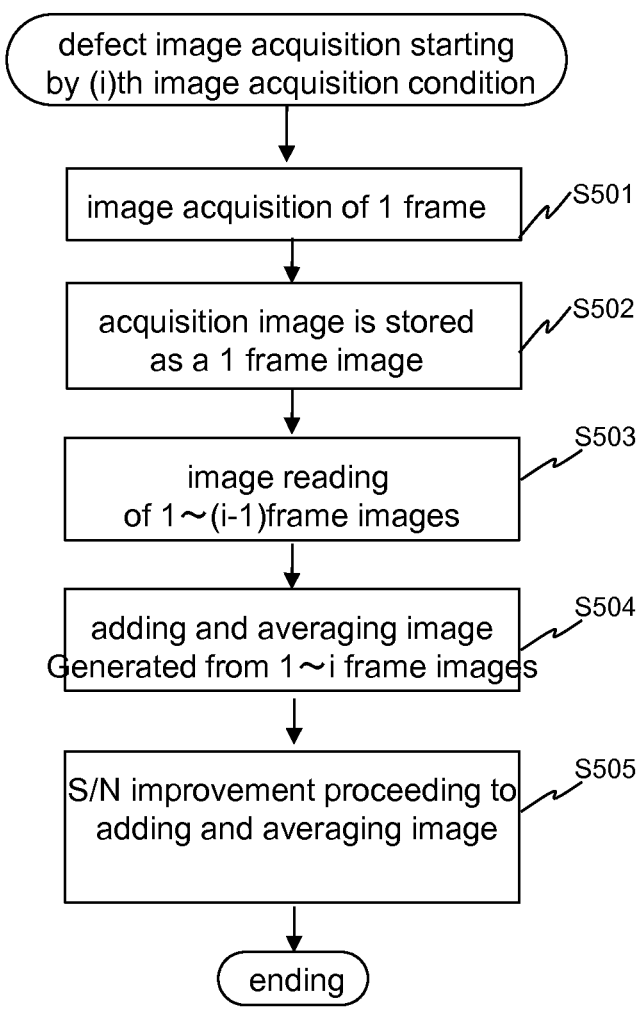
FIG. 5 is a defect image obtaining flowchart illustrating the first embodiment of in case that the image obtaining condition which different frame addition amounts are set.

FIG. 5 is a defect image obtaining flowchart illustrating the first embodiment of in case that the image obtaining condition which the amount of frame addition is different is set.

Hereinafter, a processing of S301 (the defect image acquisition by ith defect acquisition condition, 1<i≤N) in FIG. 3 will be described.

First, in step S501, the defect image of one frame is imaged by the SEM image imaging section 125.

Secondary, in step S502, the imaged defect image of the one frame is stored in the image storage section 115 as a image of ith frame.

In step S503, the images of 1st~(i−1)th frames stored after the imaging of each frame in S501 are read from the image storage section 115.

In step S504, the adding and averaging image of frame addition amount i is obtained from the read images and the image of ith frame imaged in S501 by the image processing section 123.

In step S505, the image processing section 123 performs noise removal processing to the adding and averaging image obtained by step S504 for improving S/N.

Improving processing of S/N is performed by general noise removal method. For example smoothing filter as exemplified by moving average filter and Gaussian filter.

Considering the other method, there is downsampling processing to improve S/N.

In regard to downsampling processing of ½ magnification, lengthwise direction and crosswise direction of the image sizes are reduced to ½ (that is the image size is reduced to ¼).

In this case, the value which is averaged the brightness value of longitudinal 2 pixels×side 2 pixels (sum 4 pixels) is set as a value of one pixel.

Then, one pixel possesses averaging information of 4 pixels, an image corresponding to the image performed adding and averaging of the 4 pixels (corresponding frame amount is 4) is able to be obtained as frame addition amount.

However, the downsampling processing shrinks the image size, in case of small defect, if the magnification of downsampling lowers, the defect detection accuracy lowers.

As well, the content of proceeding and the parameters of process may be changed based on the frame addition amount i in step S505.

For example, in case of low frame addition amount i, lessening the magnification of downsampling (for example ¼ and the like) improves S/N widely.

In case of high frame addition amount i, increasing the magnification of downsampling (for example ½ and the like) or not to processing the downsampling proceeding improve S/N.

The noise removal proceeding and the downsampling proceeding may be combined each other.

As well, in case of image acquisition of $1^{st}$ frame (i=1), the proceedings of S503 and S504 may be skipped in FIG. 5.

In conventional technology, the frame addition amount is set as fixed value, in case of setting N of the frame addition amount, the defect detection proceeding was performed after Nth image was imaged.

On the other hand, a proceeding of the present invention with reference to FIG. 3 and FIG. 4 is doing the defect detection and the proceeding conclusion determination with respect to each one frame imaged image.

Therefore, sum of the imaged frame amount in FIG. 3 is maximum addition amount N set for the image acquisition condition (that is same as the imaged amount of the conventional technology).

The maximum proceeding time of the image acquisition and defect detection proceeding is same as the time of the conventional technology.

However, in this present invention, the proceeding is concluded at the time of the high defect detection accuracy obtained in proceeding conclusion determination S303 of FIG. 4, the time of proceeding is surely not greater than the time of the conventional technology (that is ADR throughput improves).

Here, the requirement time of the defect image acquisition and the defect detection proceeding (FIG. 3) of S301 of FIG. 5 will be described.

The setup condition is set as N=4, the requirement time of imaging an image with respect to each one frame is 50 msec and the requirement time of defect detection proceeding (S302) is 30 msec.

The proceeding time of FIG. 3 taking FIG. 4(b) (in case of parallel proceeding) as an example will be described.

As well, regarding FIG. 3, time of the proceedings besides the image imaging of one frame (S501) and the defect detection (S302) are short enough to disregard.

The proceeding time in case of the conclusion determination in S303 at the time of 1~$4^{th}$ image acquisition condition (that is the frame addition amount is 1~4 respectively) is 80 msec (50+30), 130 msec (50×2+30), 180 msec (50×3+30), 230 msec (50×4+30) respectively.

If it is assumed that the rate of defect determinated as conclusion in S303 of 1~$4^{th}$ image acquisition condition is same (that is the rate of determination of conclusion by each image acquisition condition is 25% respectively), the average proceeding time of FIG. 3 is as below.

155 msec (80×0.25+130×0.25+180×0.25+230×0.25)

Otherwise, in the conventional technology, the processing time is always 230 msec because the image imaging of N frame is proceeded to all defects.

As discussed previously, the case that the condition stored the consecutive frame addition amount (1~N) is registered in the image acquisition recipe storage section 116.

However, this method is applicable not only in case that registered frame addition amounts are consecutive as 1, 2, 3 . . . N (1~N) ,but also in case that registered frame addition amounts are discontinuity as 1, 3, 7 . . . N (sum M:M<N).

If such is the case, it is only necessary to perform S501 and S501 for shortfall of the frame addition amount.

Second Embodiment (Image Size (Pixel Size))

Then, in case that the image acquisition recipe stores the image acquisition conditions (however imaging field of view is assumed to constant for purpose of illustration) which image sizes (pixel size) are different will be described.

An image size, a pixel size and a imaging field of view have a relation each other , in case that the imaging field of view is constant, if the image size increases, the image of smaller pixel size (that is high-resolution) could be obtained but the image acquisition time increases.

The image acquisition recipe registers the conditions storing three values which three values are (1) small, (2) middle, (3) large of image size (pixel sizes are (1) large, (2) middle, (3) small).

FIG. 6 is obtaining image examples and defect detection accuracy of these images illustrating the first embodiment of in case that the image obtaining is done about defects which largeness are different using the image obtaining conditions which each image size and image pixel are different.

FIG. 6 shows the example of obtained defect image example and defect detection accuracy in case that three defect images which defect sizes are different (large, middle, small) are acquired by the image acquisition condition (1)~(3).

601 is defect image and 602 is defect area in the defect image.

Also, imaging fields of view of image acquisition conditions (1)~(3) are same, so a row of longitudinal images are all obtained from same area.

In the defect detection proceeding step S302, in general, if the number of pixel of the defect area on the image increases, the defect detection accuracy of obtained detection result increases.

As in FIG. 6, in case that the largeness of defect is large, high defect detection accuracy is obtained in spite of the image acquired by the image acquisition condition of (1) image size small (pixel size large) but in case that the largeness of defect is middle or small, just low defect detection accuracy is obtained because the number of pixel of defect area of images is less than the number of minimum detection pixel.

On the other hand, in case that the image is acquired by the image acquisition condition of (3) image size large (pixel size small), high defect detection accuracy is obtained because the number of pixel of defect area in regard to defect detection is enough to all kind of defects (defect sizes are large, middle, small).

Therefore, in case of using the image acquisition conditions which differ the image size and the pixel size, the loop 1 of the image acquisition condition of FIG. 3 is performed in order the image sizes of the image acquisition conditions from smallest to largest (that is in order the pixel sizes of the image acquisition conditions from largest to smallest). Then, it is expected to conclude the image acquisition and the defect detection in a short time in regard to large size defects.

In case of large size defects, it is possible to obtain high defect detection accuracy in spite of the image acquisition condition of image size small (pixel size large). So it enables to conclude the defect image imaging proceeding in shorter time averagely than the case of imaging the images of all defects in high-resolution totally.

Here, the requirement time of the defect image acquisition and the defect detection proceeding (FIG. 3) using the second embodiment method will be described.

The requirement times of imaging an image of the image acquisition conditions (1)~(3) shown in FIG. 6 are (1) 50 msec, (2) 100 msec, (3) 150 msec. The requirement time of defect detection proceeding (S302) is 30 msec.

The proceeding time of FIG. 3 taking FIG. 4(b) (in case of parallel proceeding) as an example will be described.

As well, in regard to FIG. 3, time of the proceedings besides S301 and S302 are short enough to disregard.

The proceeding time in case of the conclusion determination in S303 at the time of 1~3rd image acquisition condition is 80 msec (50+30), 180 msec (50+100+30), 330 msec (50+100+150+30) respectively.

If it is assumed that the inputting rates of large, middle and small defects are 80%, 10%, 10% showed in FIG. 6, the expectation of proceeding time of FIG. 3 is 115 msec (80×0.8+180×0.1+330×0.1).

On the other hand, in the conventional technology, the processing time is always 180 msec (150+30) because the image imaging is proceeded by condition (3) which could obtain the high defect detection accuracy in spite of any largeness defects.

Third embodiment (Image Size (Imaging Field of View))

Then, in case that the image acquisition conditions which differ the image size (imaging field of view) are registered in the image acquisition recipe (however pixel size is assumed to constant for purpose of illustration).

An image size, a pixel size and a imaging field of view have a relation each other , in case that the imaging field of view is constant, if the image size increases, the image of larger field of view (that is large area) could be obtained but the image acquisition time increases.

The image acquisition recipe registers the image acquisition conditions storing three values which three values are (1) small, (2) middle, (3) large of image size (fields of view are (1) small, (2) middle, (3) large).

FIG. 7 is obtaining image examples and defect detection accuracy of these images illustrating the first embodiment of in case that the image obtaining is done about defects coordinates accuracies are different using the image obtaining conditions which each image size and imaging field of view are different.

FIG. 7 shows the example of obtained defect image example and defect detection accuracy in case that three defect images which defect coordinate accuracies are different (high, middle, low) are acquired by the image acquisition condition (1)~(3).

As in FIG. 7, in case that the defect coordinate accuracy is high, high defect detection accuracy could be obtained in spite of the image acquired by the image acquisition condition of (1) image size small (field of view is small).

But in case that the defect coordinate accuracy is middle or small, it is impossible to obtain a defect detection result because the image including the defect area could not be acquired (Supposedly, in case of detecting noise, the defect detection accuracy is low.).

On the other hand, in case that the image is acquired by the image acquisition condition of (3) image size large (field of view is large), it is possible to obtain high defect detection accuracy because the defect area could be included within the image according to all kind of defect coordinate accuracy (defect coordinate accuracies are high, middle, low).

Therefore, in case of using the image acquisition conditions which differ the image size and the field of view, the loop 1 of the image acquisition condition of FIG. 3 is performed in order the image sizes of the image acquisition conditions from smallest to largest (that is in order the fields of view of the image acquisition conditions from smallest to largest).

Then, it is expected to conclude the image acquisition and the defect detection in a short time in case of high defect coordinate accuracy.

Also, because the defect acquisition conditions (1)~(3) which the fields of view are different but which center of the image are all same, the image acquired by the condition of the image size large (the field of view large) includes a part of the image acquired by condition of (1) image size small (the field of view small) and (2) image size middle (the field of view middle).

Also, ditto with the image acquired by the condition of (2), a part of the image acquired by condition of (1) is included.

Then, in case that the image acquisition and the defect detection are performed in the order corresponding to condition (1), (2), (3), the image acquisition is performed in overlapped area by condition (2) and (3).

So, in case of the image acquisition of condition (2), imaging the area besides the area of the image acquired by condition (1) enables to increase the speed of image acquisition.

Also, ditto with the condition of (3), imaging the area besides the area of the image acquired by condition (1) and (2) may be performed.

Due to using this method, it is possible to conclude the defect image acquisition and the defect detection proceeding in shorter time than the case of using the fixed condition (always the image size large and the field of view large).

Here, the requirement time of the defect image acquisition and the defect detection proceeding (FIG. 3) using the third embodiment method will be described.

The requirement times of imaging an image of the image acquisition conditions (1)~(3) shown in FIG. 7 are assumed to (1) 50 msec, (2) 100 msec, (3) 150 msec.

Also, the requirement time of defect detection proceeding (S302) is 30 msec.

The proceeding time of FIG. 3 taking FIG. 4(b) (in case of parallel proceeding) as an example will be described.

As well, in regard to FIG. 3, time of the proceedings besides S301 and S302 are short enough to disregard.

The proceeding time in case of the conclusion determination in S303 at the time of 1~3rd image acquisition condition is 80 msec (50+30), 180 msec (50+100+30), 330 msec (50+100+150+30) respectively.

If it is assumed that the inputting rates of high, middle and low defect coordinate accuracy are 80%, 10%, 10% showed in FIG. 7, the expectation of proceeding time of FIG. 3 is 115 msec (80×0.8+180×0.1+330×0.1).

On the other hand, in the conventional technology, the processing time is always 180 msec (150+30) because the image imaging is proceeded by condition (3) which could obtain the high defect detection accuracy in spite of any defect coordinate accuracy.

As well, with respect to the three image acquisition parameters of the frame addition amount, the image size (the pixel size) and the image size (the imaging field of view), the example, using the image acquisition recipe registered the image acquisition condition which only one parameter will be changed and the other parameters are fixed, is indicated.

The present invention isn't limited to the case of changing only one parameter.

The image acquisition conditions which are the combination of a plurality of values may be used.

For example, it is not only changing the image size and the pixel size, but also it may use the condition which changing the frame addition amount.

Now, the image acquisition recipe registered to the image acquisition recipe storage section 116 may register the image acquisition condition by directly indicating the combination of the frame addition amount and the image size.

The image acquisition recipe may register the changing range of maximum value and minimum value and standard level and step size according to each parameter which are indicated in advance.

The image acquisition recipe may automatically generate and register the conditions from the range and register.

Also, the image acquisition recipe, the image acquisition condition and changing range of each parameter may be inputted from the input/output section 124 by a user, or may be read from the files described the image acquisition recipe and the image acquisition conditions.

Figure 8:
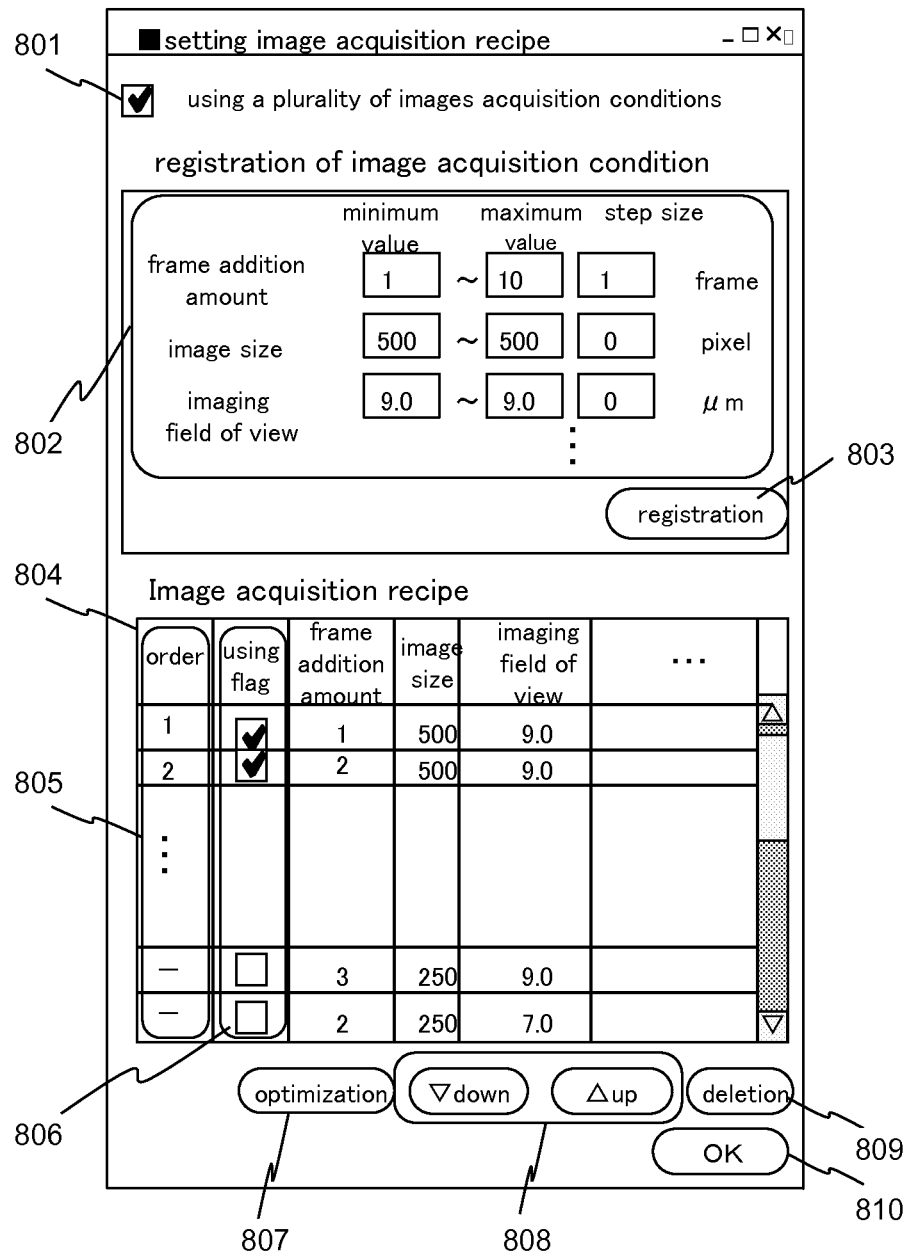
FIG. 8 is a GUI example illustrating an embodiment of registering image obtaining conditions.

FIG. 8 is a GUI example illustrating a first embodiment of the present invention of registering image obtaining conditions.

The image acquisition condition (the image acquisition recipe) is registered by a user using the GUI of FIG. 8.

Checkbox 801 is plural image acquisition conditions using checkbox to set whether the image acquisition and the defect detection proceeding are performed or not using a plurality of image acquisition conditions.

In case of checked in the checkbox, the proceeding is performed using FIG. 3 of this present invention.

In case of no checked in the checkbox, a conventional proceeding (fixed conditions) is performed to acquire the image and proceed the defect detection.

Combo-box 802 is a image acquisition condition registration combo-box to register the image acquisition condition to the image acquisition recipe.

The image acquisition condition indicated by the combo-box 802 is registered by the registration button 803.

To register the image acquisition condition, regarding each parameter for image acquisition (frame addition amount, image size, imaging field of view and the like), maximum value, minimum value and step size of each parameter are inputted by the combo-box 802, and combination of values divided by the step size from the maximum value to the minimum value is registered in block as an image acquisition condition.

As in FIG. 8, the minimum value and the maximum value are same besides parameter of frame addition amount, fixed value is set.

So, the condition (sum 10), which frame addition amount is changed counted by 1 from 1 to 10, is registered.

Also, the range of value may be registered to the image acquisition recipe without change.

The image acquisition recipe list 804 is registered to the image acquisition recipe by the registration button 803.

Each parameter value registered to the image acquisition conditions is displayed in each row of the list.

805 of the image acquisition recipe list 804 indicates the order of each image acquisition conditions and loop 1 of FIG. 3 is proceeded in the order corresponding to the number.

Check-box 806 of the image acquisition recipe list 804 set whether each condition is used or not.

Checked conditions are numbered by 805, the image acquisition condition becomes the processing target.

An optimization button 807 optimizes the order of the image acquisition condition of the image acquisition recipe of the image acquisition recipe list 804 and renumbers the order.

The proceeding of the optimization button 807 is proceeded by the image acquisition recipe modifying section 119.

After the renumbering, the conditions may be requeued and be displayed in the order corresponding to the number of the image acquisition recipe list 804.

As a method of optimization, the conditions may be lined in the order corresponding to the image acquisition time of each conditions from shortest to longest.

The image acquisition time of each condition may be listed at the look-up table and the like in advance and may be read and used, or may be calculated using information of parameter values of each condition.

Or the image acquisition time may be searched in order corresponding to the overlapped proceeding in regard to the all image acquisition conditions from shortest to longest.

For example, in case that the conditions have different frame addition amount, as noted above, it's possible to omit the overlapped proceeding by numbering in order corresponding to the frame number from the smallest to largest.

Also, an optimization button 807 may optimize only the condition checked by the check-box 806.

Also, the condition and the order registered by the results of ADR may be optimized after the processing of FIG. 3.

The button 808 could change the order optionally by a user to the numbered image acquisition condition.

In case of changing the order of the image acquisition conditions by a user, it may generate needlessness about the proceedings.

For example, in case that the multiple conditions have different frame addition amounts and the conditions are set in order corresponding to the frame addition amount from the largest to smallest.

In case that the defect detection accuracy is low and the proceeding is determined to proceed by the previously executed condition which frame addition amount is large, the condition which is latter number and low frame addition amount will be executed.

But the acquisition image by the condition, which has the frame addition amount less than the frame addition amount of the previous proceeding, lowers S/N.

So defect detection accuracy is less than the defect detection accuracy of the condition which has more frame addition amount.

The proceeding does not conclude by the latter proceeding

In case that the order is set like this, a method of marking the conditions or changing the background color of the conditions may alert to a user.

A deletion button 809 deletes the image acquisition condition indicated by the users of the image acquisition conditions displayed on the image acquisition recipe list 804 from the image acquisition recipe.

OK button 810 concludes the setting of the image acquisition recipe.

After the setting, if ADR is executed, the proceeding of FIG. 2 and FIG. 3 are executed in order corresponding to the image acquisition conditions set by the image acquisition recipe list 804.

The proceeding of FIG. 3 is performed by the image acquisition condition registered and set by the image acquisition recipe in FIG. 8, the content set for FIG. 8 may be modified based on the results of ADR.

FIG. 9 is a GUI example illustrating an embodiment of the present invention of displaying ADR results based on registered image obtaining conditions and modifying the image obtaining conditions.

The GUI shown in FIG. 9 displays the proceeding results in case that the proceeding of FIG. 3 is executed using the image acquisition recipe registered in FIG. 8 and modifies the image acquisition recipe.

901 indicates the amount of defects of review target and the requirement time to conclude the proceeding of FIG. 3.

902 indicates the results of ADR of each image acquisition condition.

For example, the number of execution (execution times), the number of conclusion determination by the proceeding conclusion determination step S303 (conclusion times), rate of the number of conclusion to the number of execution (conclusion rate), the average time of the proceeding may be indicated.

The optimization button 807 modifies the order of the image acquisition condition 804 to minimum the expectation of proceeding time based on the ADR results of 902.

In particular, it should be noted that check of the use flag of the condition of the subthreshold conclusion rate may be unset, the order may be renumbered.

Hereinafter, taking the numberl of FIG. 9 as an example, a method of modify the image acquisition condition using ADR result will be described.

The conclusion number of times of the condition of the number 1 of FIG. 9 is 0, it signifies that no defect became successful under this condition.

In case that similar a semiconductor device and a wafer of process are target of review, it is assumed that similar ADR result is obtained and the defect detection will not succeed under the condition of the number 1.

At times like this, hitting the optimization button 807 deletes the number 1 or unsets the check of the use flag and moves forward the order of the condition of on or after the number 2. It enables to increase the processing speed.

Also, based on the modification result of the optimization button 807, the range of each condition of 802 of FIG. 8 and the like may be modified.

Also, the proceeding of 903 is performed by the image acquisition recipe modifying section 119.

903 indicates the expectations of processing time of modification result by the optimization button 80703.

Hereinafter, in this embodiment, a method of increasing the ADR speed in case that the defect detection is easy is described.

The method is that a plurality of image acquisition conditions are registered to the image acquisition recipe, the image acquisition and the defect detection proceeding are performed using the image acquisition condition in order corresponding to the image acquisition time from shortest to longest.

Due to increasing the ADR throughput, the obtainable number of defects per hour increases, a defect review method and a defect review apparatus which improves the reliability of statistical process control could be proposed.

As discussed previously, the example using the image acquisition condition changing the frame addition amount and the image size, it is assumed that the conditions changing the electron optical conditions (for example accelerating voltage, prove current) and the like may be used.

In the foregoing, this invention has been concretely described by way of embodiments. However, this invention is no way limited to those embodiments alone, but can occur in various modifications and alterations without departing the scope of the invention.

What is claimed is:

1. A method for reviewing a defect in a sample, comprising:
    imaging a surface of the sample using an arbitrary image acquisition condition selected from a plurality of image acquisition conditions and obtaining an image;
    calculating a defect position of the surface of the sample using a defect image;
    determining a defect detection accuracy of the calculated defect position; and determining whether the defect detection accuracy meets predetermined requirement, wherein
until it is determined that the defect detection accuracy meets the predetermined requirement, the preceding steps are repeated, and
in calculating the defect position of the surface of the sample, when the image of a predetermined frame is imaged, images prior to the predetermined frame are added and averaged to obtain frame addition amounts.

2. The method according to claim 1,
wherein the plurality of image acquisition conditions are selected in order corresponding to a requirement time of image acquisition from shorter to longest.

3. The method according to claim 1,
wherein imaging the surface of the sample is based on predetermined position information on the surface of the sample.

4. The method according to claim 1,
wherein imaging a neighborhood area of a predetermined position coordinate on the surface of the sample.

5. The method according to claim 1,
wherein the plurality of the image acquisition conditions are generated by a combination of different frame addition amounts or different image sizes.

6. The method according to claim 1,
wherein imaging, calculating, and determining are processed in parallel.

7. The method according to claim 3,
wherein imaging a non-defective image of the surface of the sample is formed in a similar pattern to a pattern of the defect position based on the predetermined position information; and
wherein calculating the defect position is performed by comparing the defect image and the non-defective image.

8. The method according to claim 1,
wherein a non-defective image is obtained by averaging a plurality of images obtained by imaging; and
wherein calculating the defect position is performed by comparing the defect image and the non-defective image.

9. The method according to claim 1,
wherein imaging a neighborhood area of the defect position is performed again by higher-resolution than a resolution of the imaging when the accuracy meets the predetermined requirement.

10. An apparatus for reviewing defect, comprising:
a Scanning Electron Microscope (SEM), wherein the SEM images a surface of a sample using arbitrary image acquisition conditions selected from a plurality of image acquisition conditions and obtaining an image;
calculates a defect position of the surface of the sample using the defect image;
detects a defect detection accuracy of the calculated defect position; and
determines whether the defect detection accuracy meets predetermined requirement, wherein
when the defect detection accuracy does not meet the predetermined requirement the preceding actions of the SEM are repeated, and
in calculating the defect position of the surface of the sample, when the image of a predetermined frame is imaged, images prior to the predetermined frame are added and averaged to obtain frame addition amounts.

11. The apparatus according to claim 10,
wherein the plurality of image acquisition conditions are selected in order corresponding to a requirement time of image acquisition from shorter to longest.

12. The apparatus according to claim 10,
wherein imaging the surface of the sample is based on predetermined position information on the surface of the sample.

13. The apparatus according to claim 12,
wherein the SEM images a neighborhood area of a predetermined position coordinate on the surface of the sample.

14. The apparatus according to claim 10,
wherein the plurality of the image acquisition conditions are generated by a combination of different frame addition amounts or different image sizes.

15. The apparatus according to claim 10,
wherein the SEM processes in parallel the imaging, calculating, and the determining.

16. The apparatus according to claim 12,
wherein imaging a non-defective image of the surface of the sample is formed in a similar pattern to a pattern of the position based on the predetermined position information; and
wherein calculating the position is performed by comparing the defect image and the non-defective image.

17. The apparatus according to claim 10,
wherein a non-defective image is obtained by averaging a plurality of images obtained by imaging; and
wherein calculating the defect position is performed by comparing the defect image and the non-defective image.

* * * * *